United States Patent
Suzuki (10) Patent No.: US 6,787,702 B2
(45) Date of Patent: Sep. 7, 2004

(54) HARNESS-APPLIED ARMORING MEMBER AND HARNESS-ARRANGING STRUCTURE USING THE SAME

(75) Inventor: Yasuhiro Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/463,805

(22) Filed: Jun. 18, 2003

(65) Prior Publication Data

US 2004/0026109 A1 Feb. 12, 2004

(30) Foreign Application Priority Data

Aug. 7, 2002 (JP) .......................................... 2002-229657
Feb. 12, 2003 (JP) .......................................... 2003-033436

(51) Int. Cl.[7] .......................... H02G 3/00; F16G 13/00; B60J 5/06
(52) U.S. Cl. ........................ 174/72 A; 59/78.1; 296/155
(58) Field of Search ..................... 174/72 A; 59/78.1; 296/146.7, 155

(56) References Cited

U.S. PATENT DOCUMENTS

| | | | | |
|---|---|---|---|---|
| 3,664,619 A | * | 5/1972 | Heidrich et al. ............... | 248/51 |
| 3,772,875 A | * | 11/1973 | Viano .......................... | 59/78.1 |
| 4,672,805 A | * | 6/1987 | Moritz ........................ | 59/78.1 |
| 5,771,676 A | * | 6/1998 | Komiya et al. ............... | 59/78.1 |
| 6,016,844 A | * | 1/2000 | Takahashi et al. .......... | 138/120 |
| 6,167,689 B1 | * | 1/2001 | Heidrich et al. ............. | 59/78.1 |
| 6,374,589 B1 | * | 4/2002 | Kunert et al. ................. | 59/78.1 |
| 6,433,282 B1 | * | 8/2002 | Traversa ...................... | 174/95 |
| 6,492,592 B1 | * | 12/2002 | Murofushi et al. ....... | 174/72 A |
| 6,494,523 B2 | * | 12/2002 | Kobayashi ................... | 296/155 |
| 6,510,682 B2 | * | 1/2003 | Komiya et al. ............. | 59/78.1 |
| 6,575,760 B2 | * | 6/2003 | Doshita et al. ............... | 439/34 |

* cited by examiner

Primary Examiner—Dean A. Reichard
Assistant Examiner—Adolfo Nino
(74) Attorney, Agent, or Firm—Armstrong, Kratz, Quintos, Hanson & Brooks, LLP (57) ABSTRACT

A harness-applied armoring member for inserting electric wires therein is provided, by which an interference between a harness for supplying electric power and a vehicle body is prevented from occurring when a slide door of the vehicle is opened or closed. The bending radius of the armoring member varies depending on the bending direction thereof. A plurality of pieces are connected in series, a bending angle between the pieces is controlled by a stopper, and the bending direction of a front half of the armoring member is set reverse to that of a rear half thereof. Alternatively, a plurality of convex strips in the circumferential direction of the armoring member and concave grooves between the adjacent convex strips are alternately arranged in the longitudinal direction of the armoring member with varying an inner width of the concave groove depending on the bending direction.

12 Claims, 10 Drawing Sheets

HARNESS-APPLIED ARMORING MEMBER AND HARNESS-ARRANGING STRUCTURE USING THE SAME

BACKGROUND OF THE INVENTION (1) Field of the Invention

The present invention relates to a harness-applied armoring member, by which a bending direction and bending radius of a wiring harness between a vehicle body and a slide door is controlled so as to prevent the interference from occurring, and to a harness-arranging structure using the harness-applied armoring member. The wiring harness always supplies an electric power to the slide door of the vehicle such as a motor vehicle.

(2) Description of the Related Art

Figure 18:
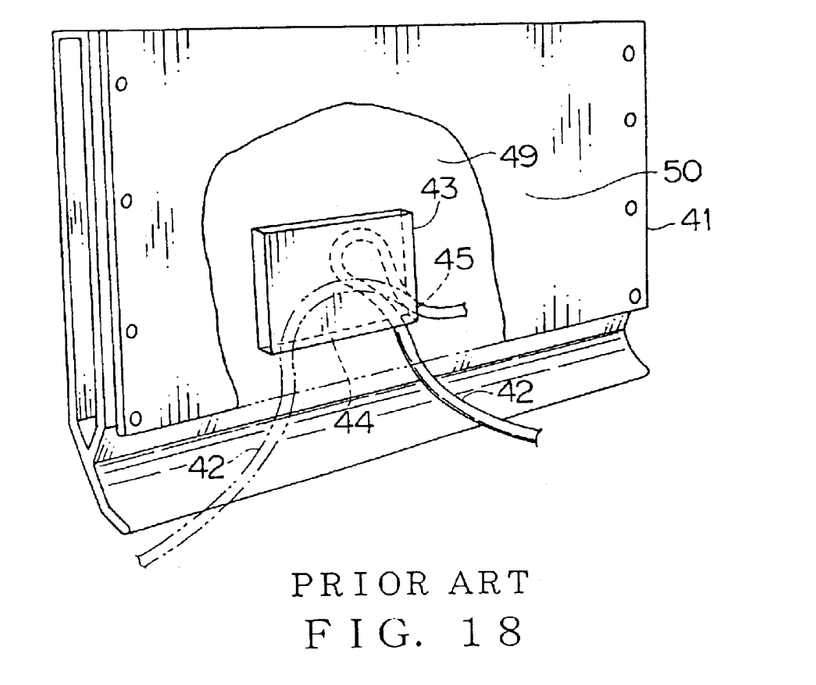
FIG. 18 is a perspective view illustrating a conventional harness-arranging structure including a slack-absorbing device.

FIG. 18 shows a conventional structure, in which in order to always supply an electric power to electric equipment, an auxiliary and so on of a slide door 41 of a motor vehicle, a wiring harness 42 is arranged from a vehicle body (not shown) to the slide door and then the wiring harness 42 is bent and received in a protector 43 made of synthetic resin at the slide door-side, so that a slack of the wiring harness 42 occurring upon opening or closing of the slide door 41 is absorbed. Such a structure as described above is disclosed, for example, in Japanese Patent Application Laid-Open 2001-354085.

The protector 43 is disposed between a door panel 49 and a door trim 50. The wiring harness 42 is guided out from a lower opening 44 having a slit-shape of the protector 43 being directed toward the vehicle body-side and arranged from a front opening 45 of the protector 43 being directed toward an auxiliary and so on of the slide door-side. The wiring harness shown with a chain line corresponds to a state when the slide door 41 is fully closed as shown in FIG. 19 (plan view), while the wiring harness shown with a continuous line corresponds to a state when the slide door 41 is fully opened as shown in FIG. 20 (plan view).

Figure 19:
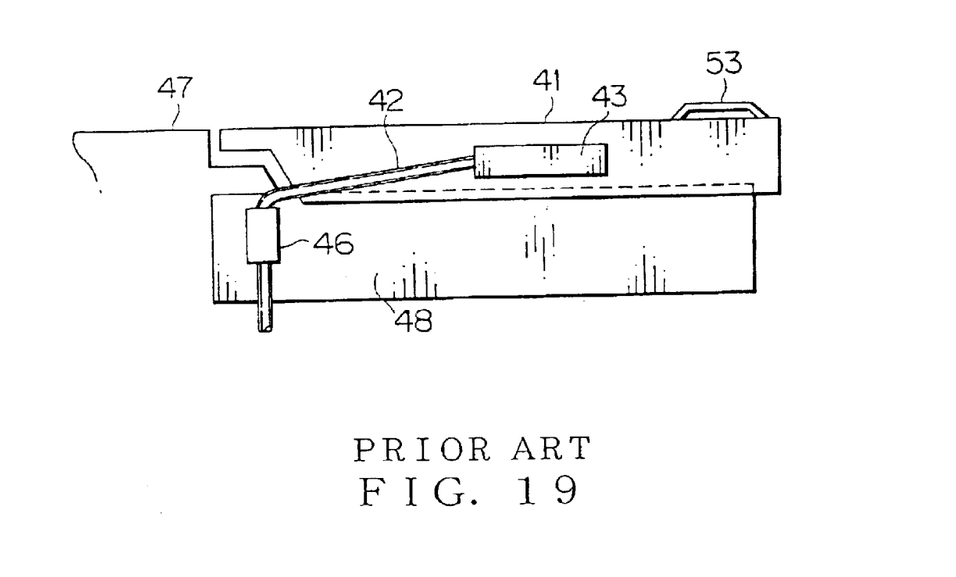
FIG. 19 is a plan view when a slide door is closed, illustrating a conventional harness-arranging structure.
Figure 20:
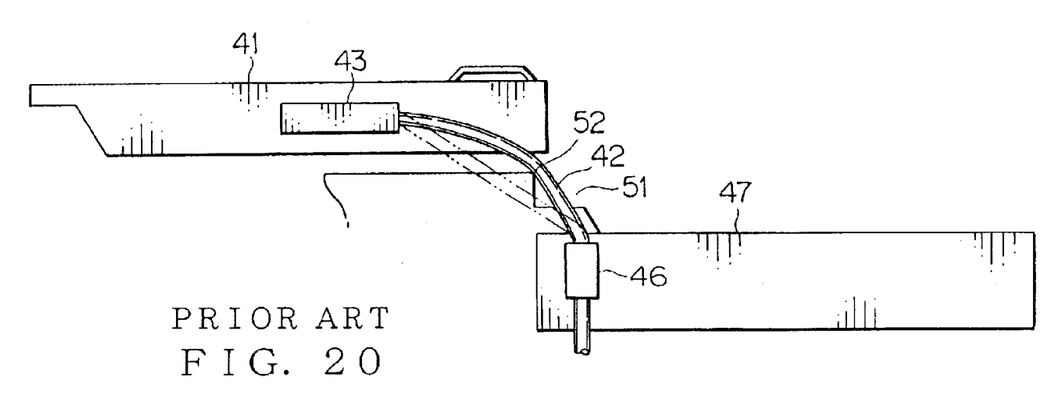
FIG. 20 is a plan view when a slide door is opened, illustrating a conventional harness-arranging structure.

In FIGS. 19 and 20, an abbreviation numeral 46 denotes a harness-fixing part, which is secured on a step part 48 of a vehicle body 47. The wiring harness 42 is swung (moved) back and forth pivotally around the harness-fixing part 46 upon opening or closing of the slide door 41. An abbreviation numeral 53 denotes a carrying handle.

As shown in FIG. 19, when the slide door 41 is fully closed, the slide door 41 is flush with the vehicle body 47. When the slide door 41 is being opened, the slide door 41 leaves the vehicle body 41 toward the outside and simultaneously moves backward. The wiring harness 42 is pulled backward (toward the harness-fixing part 46-side) upon being fully closed as shown in FIG. 19, while the wiring harness 42 is pulled forward (toward the harness-fixing part 46-side) upon being fully opened as shown in FIG. 20.

In the conventional harness-arranging structure for the slide door 41 as described above, although there is no problem in a state when the slide door 41 is fully closed as shown in FIG. 19, on the other hand, when the slide door 41 is fully opened as shown in FIG. 20, depending on a position at which the protector 43 is disposed, the wiring harness 42 easily tends to interfere with a center pillar and so on of the vehicle body 47 between the slide door 41 and the vehicle body 47 (i.e., a transition area 51) as shown with a chain line, therefore one must pay attention for the position at which the protector and so on should be disposed, causing consuming unnecessarily an excess period of time for designing.

Further, in the event that the wiring harness 42 interferes with the others, the reliability of supplying an electric power is possibly deteriorated caused by the wear or deformation of the wiring harness 42 or the receiving characteristic of the wiring harness 42 into the protector 43 is possibly deteriorated.

SUMMARY OF THE INVENTION

It is therefore an objective of the present invention to solve the above problem and to provide a harness-applied armoring member, by which an interference of a wiring harness with a vehicle body and so on can be prevented from occurring upon opening or closing of the slide door, and a harness-arranging structure using the harness-applied armoring member.

In order to attain the above objective, the present invention is to provide a harness-applied armoring member for inserting electric wires therein, wherein a bending radius of the armoring member varies depending on a bending direction of the armoring member.

With the construction described above, when a slide structure (for example, a slide door) of a vehicle is fully closed, the armoring member is bent with a small radius from a fixed structure (for example, a vehicle body)-side, while when the slide door is fully opened, the armoring member is bent with a large radius from a vehicle body-side, thereby when the slide door is fully opened, the armoring member can bend with a large radius without interfering with the vehicle body. Further, except for the case of the slide door, when electric wires (wiring harness) are being arranged into the vehicle body, even if the bending direction of the wiring harness is reverse between the right and left mounting positions of the vehicle body, the bending direction of the wiring harness can be easily securely changed at both right and left mounting positions of the vehicle body by using the same armoring member.

Preferably, the armoring member comprises a plurality of pieces connected with each other in series, each said piece having stopper parts for controlling a bending angle between the adjacent pieces, wherein the electric wires can be insertable in the interior of each said piece and a bending direction of a front half of the pieces is opposite to that of a rear half of the pieces.

With the construction described above, when the slide door is fully closed, the armoring member is bent for the rear half thereof, while when the slide door is fully opened, the armoring member is bent for the front half thereof, thereby when the slide door is fully opened, the armoring member can bend without interfering with the vehicle body. In the highly stiff pieces, the electric wires can be securely protected from an interference with the outside.

Preferably, an abutting angle or abutting position of the stopper part of the front half of the pieces is opposite to that of the rear half of the pieces.

With the construction described above, the bending of the armoring member can be securely precisely carried out, thereby an interference with the vehicle body can be more securely prevented from occurring.

Preferably, the armoring member comprises a plurality of convex strips formed in the circumferential direction of the armoring member and concave grooves formed between the adjacent convex strips, wherein the convex strips and the concave grooves are alternately arranged in the longitudinal direction of the armoring member, and an inner width of the concave groove varies depending on the bending direction of the armoring member.

With the construction described above, by flexibly responding to the oscillation and twist of the armoring member upon opening or closing of the slide door, a stress of the armoring member or a damage of the armoring member due to the stress can be prevented from occurring.

Preferably, the concave groove having a large inner width is arranged for a front and rear halves of one side of the armoring member and for a front half of an opposite side of the armoring member, while the concave groove having a small inner width is arranged for a rear half of said opposite side of the armoring member.

With the construction described above, when the slide door is fully opened, due to the concave groove having a small inner width of the rear half at the opposite side of the armoring member, an interference with the vehicle body can be prevented from occurring, and due to the concave groove having a large inner width of the front half at the opposite side thereof, the front half of the armoring member can smoothly respond to the movement of the slide door, thereby reducing a stress of the armoring member and improving the durability of the armoring member.

Preferably, the armoring member can be separated into a first divided tube including the concave grooves having a large inner width and a second divided tube including at least the concave grooves having a small inner width.

With the construction described above, by constructing the armoring member with a thin corrugated tube made of synthetic resin, the armoring member can be made to be lightweight with low cost. Since the corrugated tube is made in a divided shape, the manufacture of the armoring member can be easily carried out.

Preferably, the armoring member is formed integrally being made of resilient material.

With the construction described above, the electric wires can be more securely protected from an impact or oscillation from the outside.

In order to attain the above objective, the present invention is to provide a harness-arranging structure comprising:
 a fixed structure;
 a slide structure including a slack-absorbing device for absorbing a slack of electric wires; and
 a harness-applied armoring member for inserting the electric wires therein, a bending radius of the armoring member varying depending on a bending direction of the armoring member,
 wherein the electric wires are arranged from the fixed structure to the slack-absorbing device of the slide structure and the armoring member is disposed between the fixed structure and the slide structure.

With the construction described above, the electric wires can be securely protected between the fixed structure (for example, vehicle body) and the slide structure (for example, slide door).

Preferably, the armoring member is bent with a small radius from the fixed structure-side when the slide structure is fully closed, while the armoring member is bent with a large radius from the fixed structure-side when the slide structure is fully opened.

With the construction described above, an interference between the electric wires and the fixed structure can be prevented from occurring, thereby preventing the wear, deformation or damage of the electric wires and improving the reliability of the power supply to the slide structure.

Preferably, the fixed structure comprises a harness-fixing part to which the armoring member is connected.

With the construction described above, since the armoring member can be stably located between the slide structure and the fixed structure without shifting, therefore the protection and the control in the bending direction of the electric wires can be securely carried out, thereby further improving the reliability of the power supply to the slide structure.

DESCRIPTION OF THE PREFERRED EMBODIMENTS

In the following, the preferred embodiments of the present invention will be explained with reference to the attached drawings.

Figure 1:
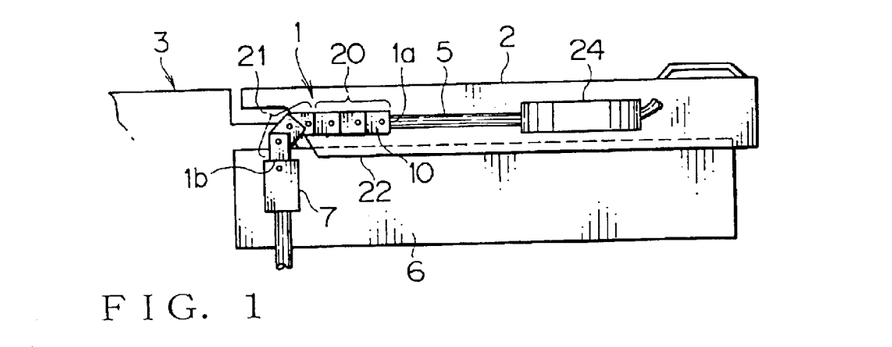
FIG. 1 is a plan view when a slide door is fully closed, illustrating a preferred embodiment of a harness-arranging structure applying a first preferred embodiment of a harness-applied armoring member according to the present invention.
Figure 2:
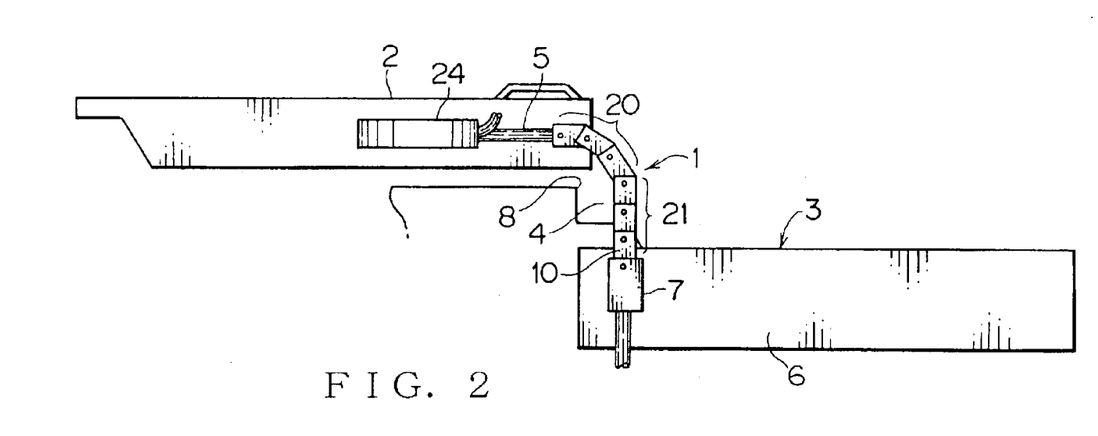
FIG. 2 is a plan view when a slide door is fully opened, illustrating a preferred embodiment of a harness-arranging structure applying the first preferred embodiment of a harness-applied armoring member according to the present invention.

FIG. 1 is a plan view when a slide door of a motor vehicle is fully closed, illustrating a preferred embodiment of a harness-arranging structure applying a first preferred embodiment of a harness-applied armoring member according to the present invention, while FIG. 2 is a plan view when the slide door is fully opened.

A harness-applied armoring member 1 is formed in a caterpillar shape and covers a wiring harness 5 between a slide door 2 (slide structure) and a vehicle body 3 (fixed structure). That is, the wiring harness 5 is inserted into the inside space of the harness-applied armoring member 1. One end 1a of the armoring member 1 freely (movably) comes in contact with the wiring harness 5 at the slide door-side, while an opposite end 1b of the armoring member 1 is connected to a harness-fixing part 7 on a step 6 at the vehicle body 3-side.

As shown in FIG. 1, when the slide door 2 is fully closed, the armoring member 1 freely bends forward (in the closing direction of the slide door 2) pivotally around the harness-fixing part 7, and as shown in FIG. 2, when the slide door 2 is fully opened, the armoring member 1 protrudes from the harness-fixing part 7 outward in a direction crossing at right angles to the sliding direction of the slide door 2 and bends backward (in the opening direction of the slide door 2) from the middle portion in the longitudinal direction thereof, thereby preventing an interference with a center pillar 8 of the vehicle body 3 from occurring.

Figure 3:
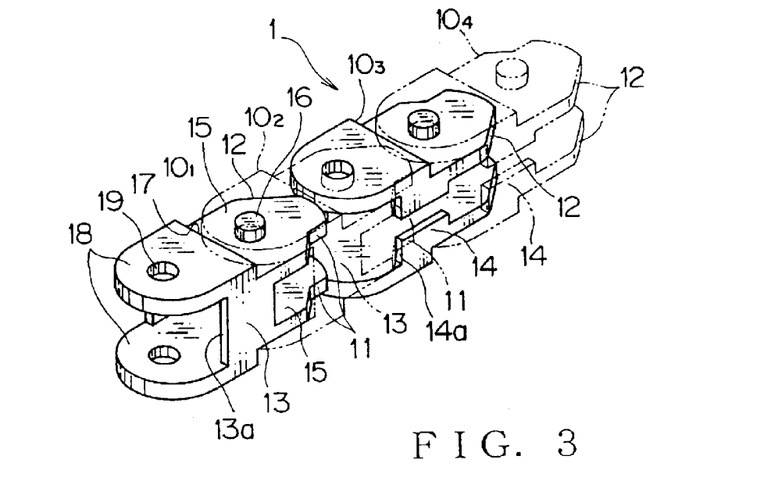
FIG. 3 is a perspective view illustrating the first preferred embodiment of a harness-applied armoring member according to the present invention.

FIG. 3 is a perspective view illustrating the first preferred embodiment of the harness-applied armoring member 1 according to the present invention. As shown in FIG. 3, the armoring member 1 is formed by connecting a plurality of pieces 10 ($10_1$–$10_n$) made of synthetic resin in series. Each piece 10 comprises: a straight stopper 11 extending in the longitudinal direction of the armoring member 1 at one side thereof; an inclined shape stopper 12 at an opposite side thereof; and walls (abutting portions) 13 and 14 at both sides that abut on the respective stoppers (abutted portions) 11 and 12, respectively, of the adjacent piece 10, wherein the assembling direction of the pieces 10 of a front half in the longitudinal direction of the armoring member 1 is set reverse to that of the pieces 10 of a rear half in the longitudinal direction of the armoring member 1, thereby when one wall 13 (14) abuts on the straight stopper 11, the bend of the armoring member 1 is controlled so that the armoring member 1 is kept straight without being bent, while when the opposite wall 14 (13) abuts on the inclined shape stopper 12, the armoring member 1 largely bends, thereby attaining the bending states as shown in FIGS. 1 and 2. Here, the front and rear halves described above mean respective positions relative to the harness-fixing part 7 (FIG. 1).

As shown in FIG. 3, the straight stopper 11 and inclined shape stopper 12 are formed on the side at front end of respective flat walls 15 facing to each other being situated at top and bottom. An upward boss 16 is formed on the upper wall 15, while a downward boss 16 is formed on the lower wall 15. The pair of the walls 15 situated top and bottom having the stoppers 11 and 12 continues integrally to a pair of flat walls 18 having a half circular shape situated top and bottom by way of a step 17. The wall 18 has a hole 19 for receiving the corresponding boss 16 thereinto. The distance between the pair of the walls 18 is longer than that between the pair of the walls 15. The wall 15 at the stopper-side of the piece 10 is situated inside the pair of the walls 18. The boss 16 rotatably engages with the hole 19.

The pair of the walls 15 is integrally continues to the pair of the walls 18 through the step 17 and a perpendicular wall 13 situated at one side. A pair of divided walls 14 situated up and down at an opposite side facing the wall 13 situated at one side is depending from the walls 15 and 18 situated up and down. One end of each wall 13, 14 at both sides functions as abutting part 13a, 14a against the corresponding stoppers 11, 12. Preferably, each abutting part 13a, 14a is a surface having a tapered shape.

The perpendicular wall 13 (14) abuts against the straight stopper 11, thereby preventing the piece 10 from rotating in one direction, keeping the armoring member 1 straight, and the piece 10 rotates largely in an opposite direction until the wall 14 (13) abuts against the inclined shape stopper 12, thereby bending the armoring member 1 largely.

The upper and lower walls 15 and 18 can bend up and down within the range of distance between the pair of the divided walls 14, thereby the boss 16 engages with the hole 19. At that time, the piece 10 is reversed up and down so as to engage the boss 16 with the hole 19, thereby the positions of the stoppers 11 and 12 are reversed right and left, rendering the straight stopper 11 to prevent the piece 10 from rotating in the horizontal direction, that is, to prevent the armoring member 1 from bending, and rendering the stopper 12 to enable the piece 10 to rotate, that is, to enable the armoring member 1 to bend, thereby rendering the armoring member 1 to be able to largely rotate in one direction as shown in FIG. 1, and on the other hand, controlling the armoring member 1 to bend in an opposite direction, that is, rendering the armoring member 1 to bend with a small radius as shown in FIG. 2.

Figure 4:
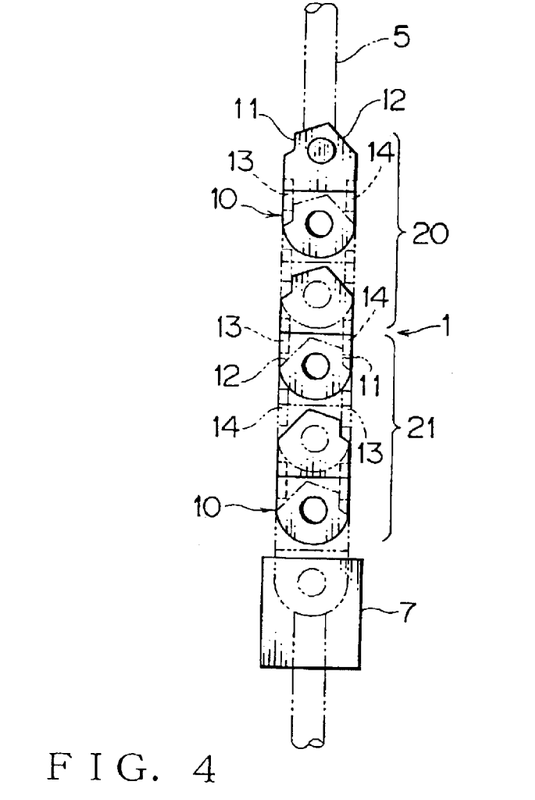
FIG. 4 is a plan view illustrating the first preferred embodiment of a harness-applied armoring member according to the present invention.

FIG. 4 is a plan view illustrating the first preferred embodiment of the harness-applied armoring member 1 according to the present invention. As shown in FIG. 4, for the front half 20 in the longitudinal direction of the armoring member 1, the inclined shape stopper 12 of each piece 10 is located at right side and the straight stopper 11 is located at left side, while for the rear half 21 in the longitudinal direction of the armoring member 1, the inclined shape stopper 12 of each piece 10 is located at left side and the straight stopper 11 is located at right side. With the construction described above, the front half 20 of the armoring member 1 bends in the left direction but does not bend in the right direction. On the contrary, the rear half 21 of the armoring member 1 bends in the right direction but does not bend in the left direction.

Therefore, as shown in FIG. 1, when the slide door 2 is fully closed, the rear half 21 bends in the right direction (in the closing direction of the slide door 2), that is, the armoring member 1 bends from the root at the harness-fixing part 7-side, while the front half 20 straightly extends in the closing direction of the slide door 2, thereby protecting the wiring harness 5 without an interference with the door trim 22 and so on. The armoring member 1 may be supported pivotally by the harness-fixing part 7 so as to be rotatable only in the right direction (rotation in the left direction being stopped by a stopper or the like).

As shown in FIG. 2, when the slide door 2 is fully opened, the rear half 21 straightly extends in the extending direction of the harness-fixing part 7 without bending in the left direction (in the opening direction of the slide door 2) so as to prevent an interference with the vehicle body 3 from occurring, while the front half 20 bends in the opening direction of the slide door 2, thereby the wiring harness 5 can smoothly bend without being excessively twisted.

Since the wiring harness 5 is prevented from further bending at a time point when the wall 13, 14 abuts against the stopper 11, 12 when the slide door 2 is fully opened or closed, therefore the wiring harness 5 is prevented from being affected by an excessive stress, thereby the wiring harness 5 is prevented from being elastically deformed or damaged, thereby improving the reliability of the electric power supply.

The armoring member 1 illustrated in FIG. 4 also can bend in S-shape by bending the straight portion 20 of the front half outward (toward the outside of a vehicle room) shown in FIG. 1, for example. In the preferred embodiment illustrated in FIGS. 1 and 2, the armoring member 1 bends in S-shape on the way of the opening or closing of the slide door 2, thereby the whole length of the armoring member 1 can be restricted and the absorbing of a slack of the wiring harness 5 can be smoothly carried out.

The preferred embodiment of the armoring member 1 illustrated in FIG. 3 is only one example. Instead of this embodiment, the armoring member 1 may have a different shape provided that the piece 10 comprises: stoppers 11 and 12 having two different angles; abutting parts 13a and 14a corresponding to the respective stoppers 11 and 12, respectively; and parts 16 and 19 for securing each piece 10 to be connected rotatably to each other. Also, the walls 15, 18, 13 and 14 protect the wiring harness 5 (consisting of a plurality of electric wires) situated thereinside from an interference with the outside, and preferably the wiring harness 5 can be easily inserted into the armoring member 1. The stoppers 11 and 12 are not necessarily to be each pair situated up and down, but may be one of each situated up and down. Similarly, the abutting parts 13a and 14a are not necessarily to be each pair situated up and down, but may be one of each situated up and down. In the preferred embodiment described above, the stoppers 11, 12 and the abutting parts 13a, 14a are parts of the walls 15, 13 and 14, however they are not necessarily so. The number of the pieces 10 can be changed according to needs, that is, according to the length, thickness and so on of the wiring harness 5.

In FIGS. 1 and 2, a harness protector or harness-rolling device, which is a slack-absorbing device 24 for absorbing a slack of the wiring harness 5, is fixed in the inside of the slide door 1. In the following, the application of the slack-absorbing device 24 will be explained with reference to FIGS. 5–8.

Figure 5:
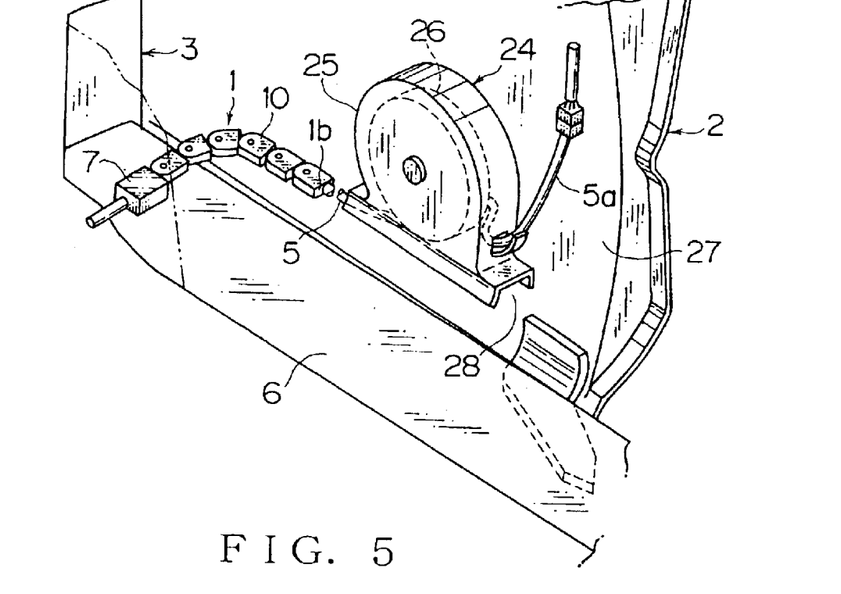
FIG. 5 is a perspective view when a slide door is closed, illustrating a harness-arranging structure including a preferred embodiment of a slack-absorbing device.
Figure 6:
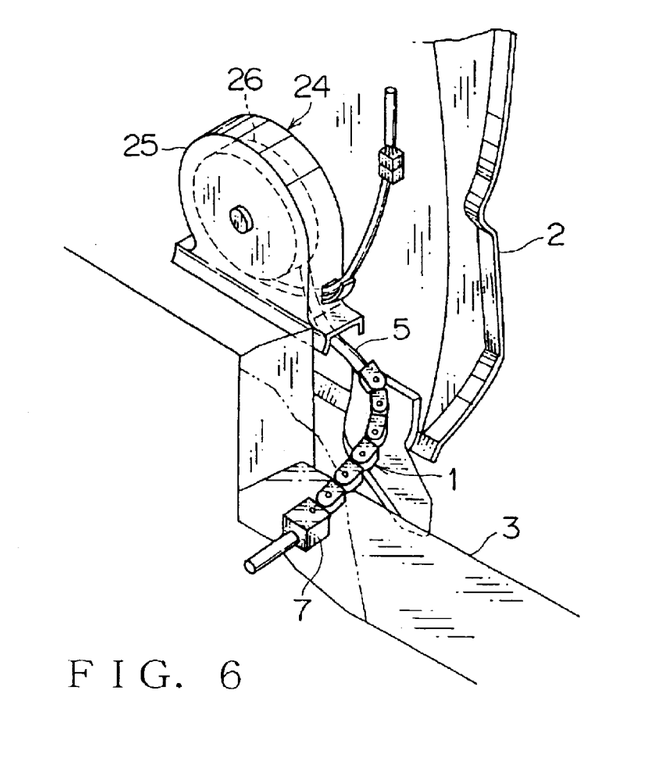
FIG. 6 is a perspective view when a slide door is opened, illustrating a harness-arranging structure including a preferred embodiment of a slack-absorbing device.

FIGS. 5 and 6 show an example of use of a harness-rolling device 24 as the slack-absorbing device at the slide door-side, in which the device 24 has a reel 26 that is rotatable in a case 25 having a circular shape, the wiring harness 5 is rolled around the reel 26, and the reel 26 is biased in the harness-pulling direction by a spring member (not shown). The device 24 is mounted between a door panel 27 made of metal and a door trim (not shown) made of synthetic resin, for example.

The wiring harness 5 is pulled out from a slit-shaped flat lower opening 28 of the case 25 and arranged into the vehicle body-side. The wiring harness 5 is positioned and protected by the armoring member 1 between the slide door 2 and the vehicle body 3. A base end of the armoring member 1 is fixed to the step 6 with the harness-fixing part 7. In FIG. 5, for convenience, the wiring harness 5 between the end 1b of the armoring member 1 and the case 25 is not shown, but actually the wiring harness 5 extends long toward the device 24 as shown in FIG. 1. The wiring harness 5 is guided out from the front end-side of the case 25 and arranged into the slide door-side.

When the slide door 2 is closed as shown in FIG. 5, the wiring harness 5 is pulled out backward from the case 25, while when the slide door 2 is opened as shown in FIG. 6, the wiring harness 5 is pulled out forward from the case 25. On the way of opening or closing of the slide door 2, the wiring harness tends to slacken, but the reel 26 is rotated by the bias of the spring, causing the wiring harness 5 being pulled into the case 25, thereby the slack is absorbed.

Figure 7:
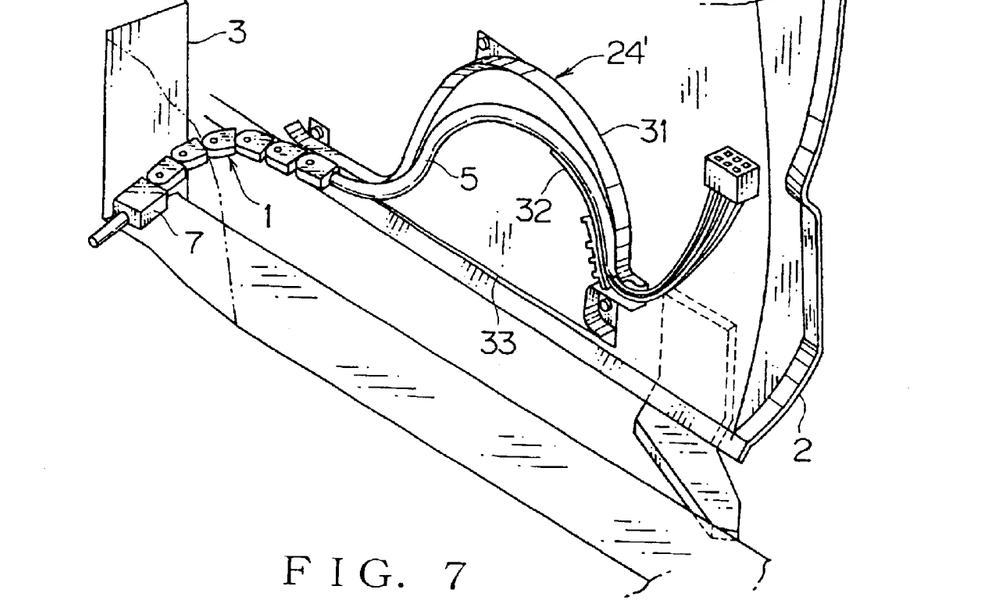
FIG. 7 is a perspective view when a slide door is closed, illustrating a harness-arranging structure including another preferred embodiment of a slack-absorbing device.
Figure 8:
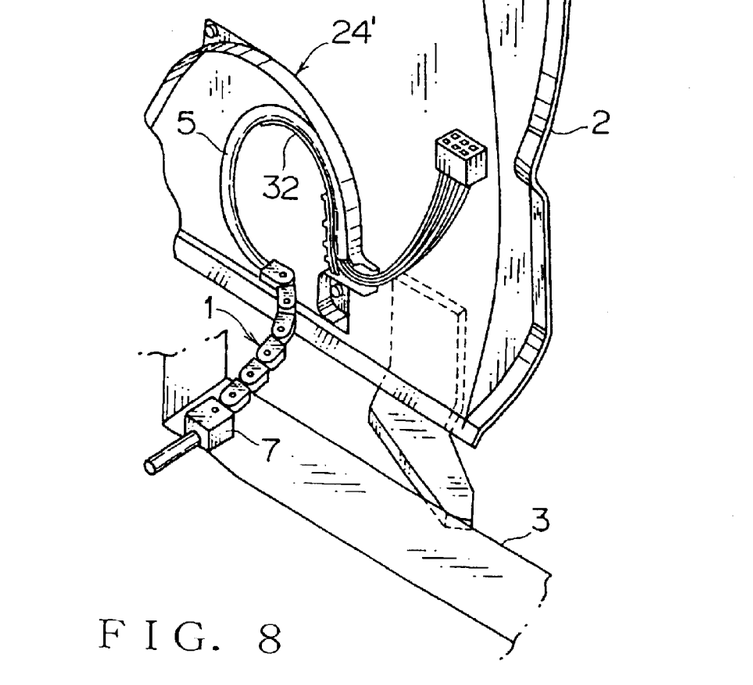
FIG. 8 is a perspective view when a slide door is opened, illustrating a harness-arranging structure including the other preferred embodiment of a slack-absorbing device.

FIGS. 7 and 8 illustrate an example of use of a harness protector 24' as the slack-absorbing device, in which the harness protector 24' consists of a base 31, cover (not shown), and a leaf spring 32 (resilient member) situated in the base 31, and the wiring harness 5 is pulled into the protector 24' to be in a curved shape by the bias of the leaf spring 32. The wiring harness 5 is guided out from an opening at the front end-side of the protector 24' to the slide door-side, arranged into the vehicle body-side from a slit-shaped opening 33 situated at the lower side, and restricted for its direction and protected by the armoring member 1 between the slide door 2 and the vehicle body 3.

When the slide door 2 is closed as shown in FIG. 7, the wiring harness 5 is pulled backward resisting against the bias of the leaf spring 32, while when the slide door 2 is opened as shown in FIG. 8, the wiring harness 5 is pulled forward resisting against the bias of the leaf spring 32 and bent with a small radius in the protector 24'. On the way of opening or closing of the slide door 2, the wiring harness tends to slacken downward, but is pulled into the protector 24' by the bias of the leaf spring 32, thereby the slack is absorbed.

In the preferred embodiment described above, for example, the front half 20 of the armoring member 1 is set rotatable only in the left direction and not rotatable in the right direction (i.e. positioned straightly). However, instead, the stopper 11 (in FIG. 3) may have an inclined angle so that the front half 20 can bend in the right direction with a small angle (required angle). The magnitude of the bending can be adjusted with an inclined angle (abutting angle) of the stoppers 11 and 12.

The bending angle also can be adjusted by changing the position of the stoppers 11, 12 relative to the abutting parts 13a, 14a without changing the shape (i.e. changing the inclined angle) of the stopper as described above. In this case, the bending angle becomes small when the stopper is situated outside, while the bending angle becomes large when the stopper is situated inside (near to the center of the piece).

In the preferred embodiment described above, the bending direction of the front half 20 of the armoring member 1 is set different from that of the rear half 21, however, instead, for example, the bending directions of a front portion, middle portion and rear portion may be set different from each other alternately.

Further, instead of the wiring harness consisting of a plurality of electric wires as described above, only one electric wire may be inserted into the armoring member 1. A cabtyre cable may be used. The electric wire may be coated with a protecting tube made of synthetic resin, which is soft or flexible.

Furthermore, in the preferred embodiment as described above, the explanation is done as to the slide door 2 of a motor vehicle, however, instead, the armoring member 1 also can be applied to a slide door of a vehicle except a motor vehicle or a slide structure except a door.

Furthermore, the armoring member 1 also can be applied to a harness-arranging structure having no slide structure. For example, when the wiring harness 5 is arranged onto a floor of the vehicle body 3, the wiring harness is bent in the right direction from its root to the left side of the vehicle and only the end of the wiring harness 5 is bent in the left direction to the right side of the vehicle (for example, otherwise, the wiring harness strongly interfering with another part), a worker can easily securely arrange the wiring harness 5 according to a specific arranging design even if the worker carries out the arranging work in a narrow space with random work (i.e. without using eyes to do work). In such a case, the armoring member 1 can be used in common for left and right, and the number of parts and cost can be reduced.

FIGS. 9–12 illustrate a second preferred embodiment of a harness-applied armoring member according to the present invention and a harness-arranging structure using the harness-applied armoring member.

Figure 9:
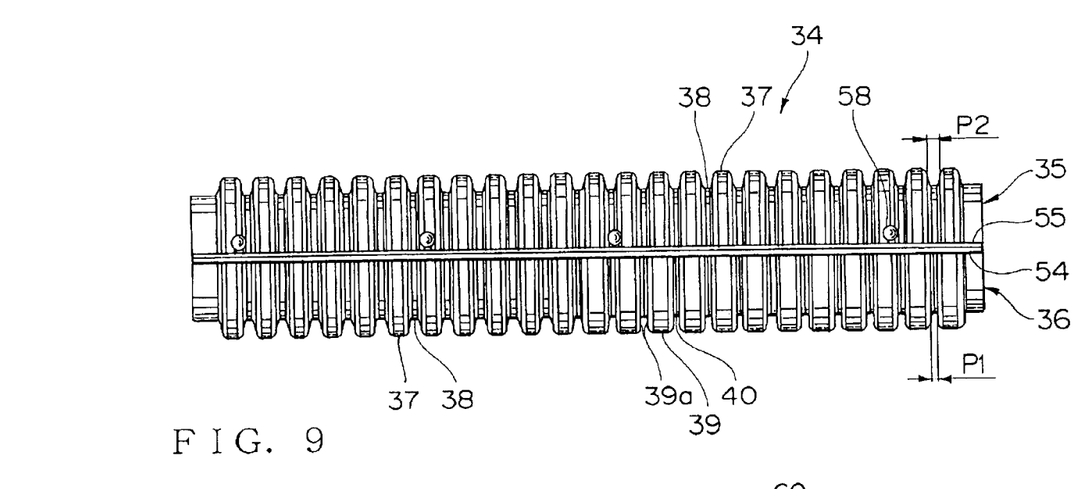
FIG. 9 is a plan view illustrating a second preferred embodiment of a harness-applied armoring member according to the present invention.
Figure 10:
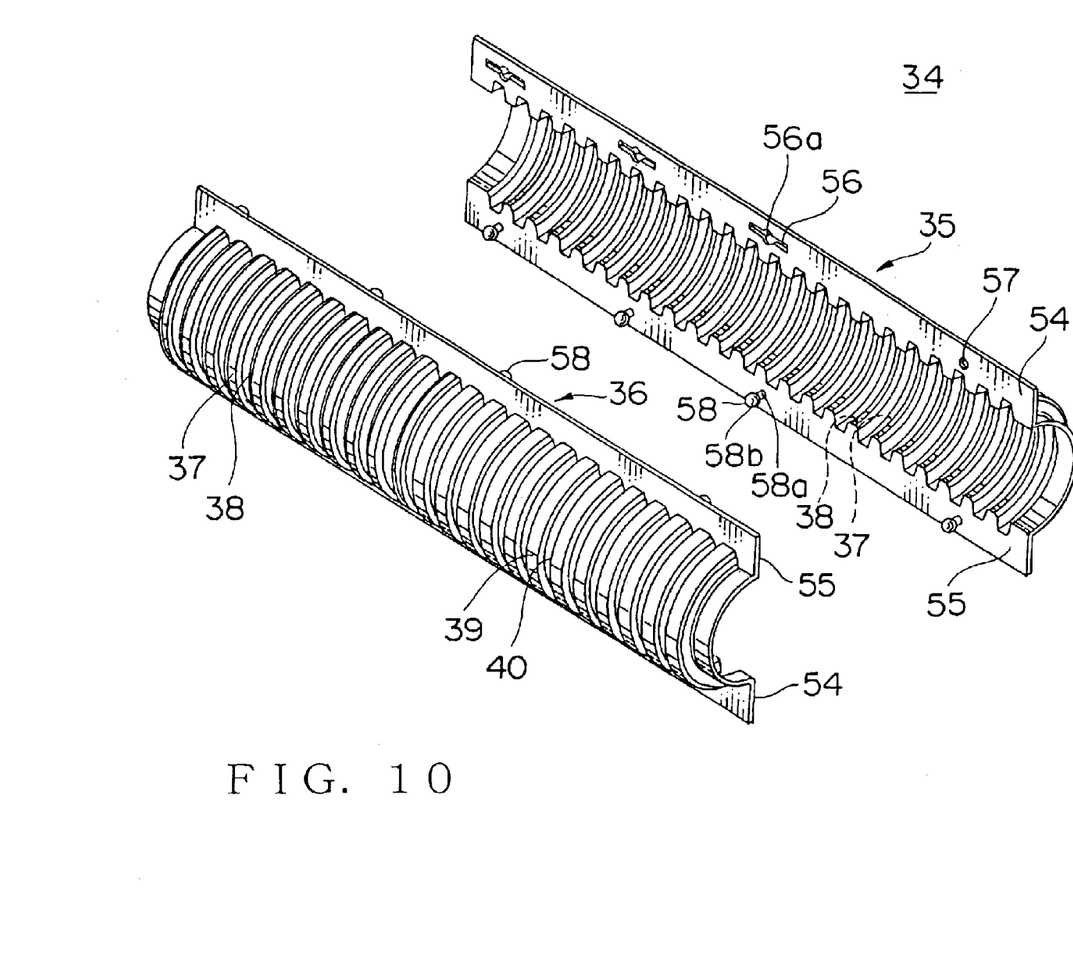
FIG. 10 is an exploded perspective view illustrating the second preferred embodiment of a harness-applied armoring member according to the present invention.

As shown in FIGS. 9 and 10, this harness-applied armoring member 34 is made of synthetic resin such as polypropylene and is a corrugated tube formed in a shape divided into right and left parts, in which one divided tube 35 has bellows-shape convex strips 37 and concave grooves 38 both having a normal size for the whole length of the armoring member 34, while an opposite tube 36 has bellows-shape convex strips 37 and concave grooves 38 both having a normal size for a front half of the armoring member 34 and bellows-shape convex strips 39 wider than the normal size and concave grooves 40 narrower than the normal size for a rear half of the armoring member 34.

A reason why the corrugated tube 34 is formed in the divided shape is to obtain the bellows-shape convex strips 39 and concave grooves 40 each having a different size from the normal size in a molding process of the resin. Therefore, if an integral molding process of the resin is available, the corrugated tube 34 does not necessarily have the divided shape as described above. Here, the convex strips 37 having a normal size mean convex strips of a corrugated tube (not shown) which has been conventionally used in a vehicle. The convex strip 37 continues to a trough of the adjacent concave groove 38, which continues to the next convex strip 37, thereby a plurality of the convex strips 37 and the concave grooves 38 are alternately arranged in the longitudinal direction of the corrugated tube 34.

As shown in FIG. 9, the narrow concave groove 40 is situated between the wide convex strips 39, the convex strip 37 having the normal size of the one divided corrugated tube 35 is located at the reverse side in the diameter direction of the wide convex strip 39, and the concave groove 38 having the normal size of the one divided corrugated tube 35 is located at the reverse side in the diameter direction of the narrow concave groove 40. Each facing surface 39a of the wide convex strip 39 stands close to the other facing surface 39a in the axial direction of the corrugated tube 34. In the preferred embodiment, an inner width $P_1$ of the narrow concave groove 40 is about the half of an inner width $P_2$ of the concave groove 38 having the normal size. The number of the convex strips 37 is equal to that of the convex strips 39 and a pitch between each convex strips is the same. Further, the radii of the divided tube 35 and 36 (i.e. outer diameters of the convex strip 37 and 39, and outer and inner diameters of the troughs of concave grooves 38 and 40) are the same with each other.

As shown in FIG. 10, the divided tubes 35 and 36 are joined to each other with flanges 54 and 55. Each projection 58 of one flange 55 engages with a plurality of long holes 56 formed in the opposite flange 54 and a hole 57 formed at the base side thereof, thereby the tubes 35 and 36 are locked to each other bendably. When the armoring member 34 bends, the flanges 54 and 55 slide with each other, thereby making the bend of the armoring member 34 smooth. The long hole 56 extends in the longitudinal direction of the corrugated tube 34 having a circular hole 56a for inserting the projection 58 therethrough situated at the center of the long hole 56. The projection 58 consists of a pillar 58a and a sphere 58b situated at the end of the pillar 58a. A shape, size and the number of the projection 58 and the long hole 56 can be set according to needs.

Figure 11:
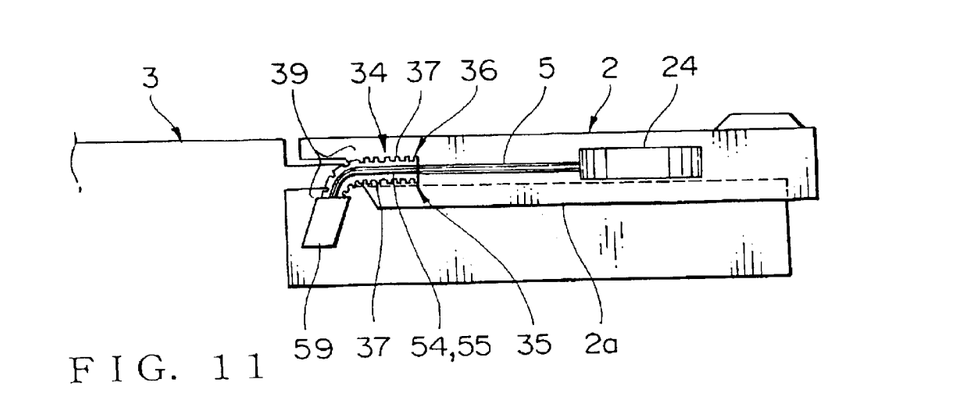
FIG. 11 is a plan view when a slide door is fully closed, illustrating a preferred embodiment of a harness-arranging structure applying the second preferred embodiment of a harness-applied armoring member according to the present invention.
Figure 12:
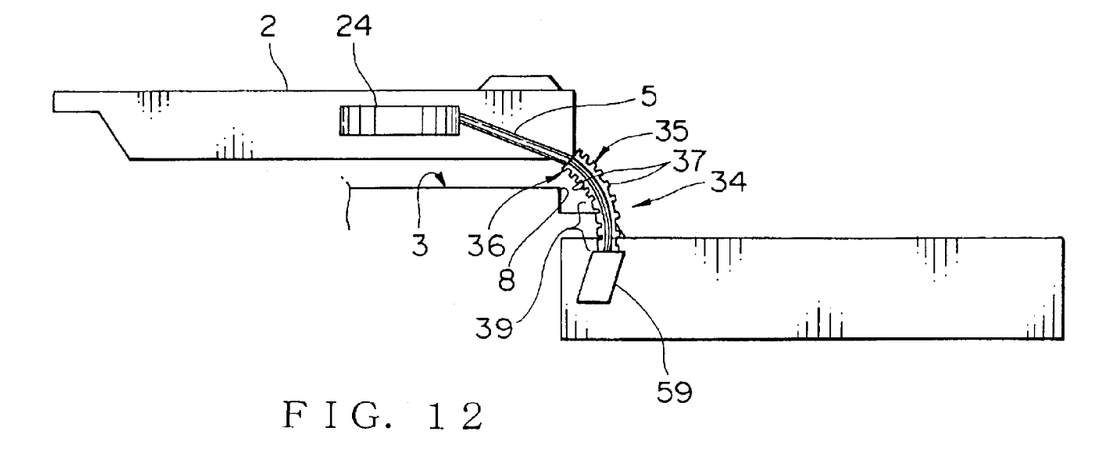
FIG. 12 is a plan view when a slide door is fully opened, illustrating a preferred embodiment of a harness-arranging structure applying the second preferred embodiment of a harness-applied armoring member according to the present invention.

As shown in FIGS. 11 and 12, when the armoring member 34 is mounted over the wiring harness 5 for the step portion between the slide door 2 and the vehicle body 3, the one divided tube 35 having the convex strips 37 having the normal size is arranged at the front side (right side in the figure) of the vehicle, while the opposite divided tube 36 having the wide convex strips 39 is arranged at the rear side (left side in the figure) of the vehicle. The wide convex strips 39 are arranged from the harness-fixing part 59 of the vehicle body-side up to the center or about the center in the longitudinal direction of the corrugated tube 34.

The armoring member 34 is formed in the divided shape, thereby it can be easily mounted over the wiring harness 5 at the vehicle body-side afterward. The wiring harness 5 is formed by bundling up a plurality of electric wires with a tape or by being coated with a soft tube (not shown).

With the structure described above, when the slide door 2 is fully closed as shown in FIG. 11, the one divided tube 35 is located inside in the bending direction and softly bends with a small radius pivotally around the harness-fixing part 59 due to the convex strips 37 and the concave grooves 38 (FIG. 9) having the normal size, thereby the armoring member 34 smoothly bends in the closing direction of the slide door 2 without an interference with the door trim 2a made of synthetic resin of the slide door 2.

When the slide door 2 is fully opened as shown in FIG. 12, the opposite divided tube 36 having the wide convex strips 39 and the narrow concave grooves 40 for the rear half of the divided tube 36 is located inside in the bending direction and bends with a large radius pivotally around the harness-fixing part 59 by the abutting between the wide convex strips 39, thereby preventing an interference between the armoring member 34 and the center pillar 8 of the vehicle body 3 from occurring. Due to the front half of the opposite divided tube 36, that is, due to the convex strips 37 and the concave grooves 38 (FIG. 9) both having the normal size situated further from the harness-fixing part 59, the front half of the armoring member 34 smoothly bends with a radius smaller than that of the rear half (39) toward the slack-absorbing device 24 in the slide door 2.

The harness 59 supports the armoring member 34 rotatable in the circumferential direction with a base made of synthetic resin, a cover, and a ring-shaped rotatable member (not shown) situated therein, and absorbs the twist of the wiring harness 5 in a transition area and the armoring member 34 when the slide door 2 is opened or closed. The base of the harness-fixing part 34 is fixed to the rotatable member, which rotates inside the base and the cover.

For the slack-absorbing device 24, the one shown in FIG. 5 or FIG. 7 can be used, but is not limited to these. The behavior of the wiring harness 5 upon opening or closing of the slide door 2 is the same as that is described in the above example. The structure of the harness-fixing part 59 and the slack-absorbing device 24 is the same as that of those described in a third preferred embodiment, which will be explained later on.

The flanges 54 and 55 of the divided tube 35 and 36, respectively, may be formed partially only for the locking portions (56, 58). Further, instead of the flanges 54 and 55, the divided tubes 35 and 36 may be joined to each other with a locking claw and a locking frame (not shown), for example. Further, instead of the constitution described above, a pitch portion of each convex strip 37 may be set different, that is, the wide convex strip 39 may correspond to a small pitch portion while the convex strip 37 having the normal size may correspond to a large pitch portion. Further, according to the bending configuration of the armoring member 34, only the wide convex strips 39 and the narrow concave grooves 40 may be formed for the whole length of the opposite divided tube 36. Furthermore, only a portion having the wide convex strips 39 and the narrow concave grooves 40 may be set dividable, while the convex strips 37 and the concave grooves 38 both having the normal size of the one and opposite tubes may be formed integrally.

With the preferred embodiment described above, the harness-applied armoring member 34 can be prevented from being worn or damaged due to an interference with the vehicle body 3 and the door trim 2a, and an inexpensive armoring member 34 can be attained by using a resin such as polypropylene. Further, the armoring member 34 (corrugated tube 34) is formed consisting of the divided members as described above, thereby the armoring member 34, which has a bending radius varing depending on a bending direction thereof, can be easily formed. The armoring member 34 can smoothly bend with the flanges 54 and 55, preventing the armoring member 34 from being deformed. Since there is no need to insert electric wires in the armoring member 34 beforehand, even after the wiring harness 5 is mounted on the vehicle, the armoring member 34 can be easily inserted over the wiring harness 5. Since the divided tubes 35 and 36 are locked to each other, therefore there is no need to bundle it with a tape for preventing it from coming apart like a corrugated tube having a slit for inserting electric wires therein.

FIGS. 13–17 illustrate a third preferred embodiment of a harness-applied armoring member according to the present invention and a harness-arranging structure using the harness-applied armoring member.

Figure 13:
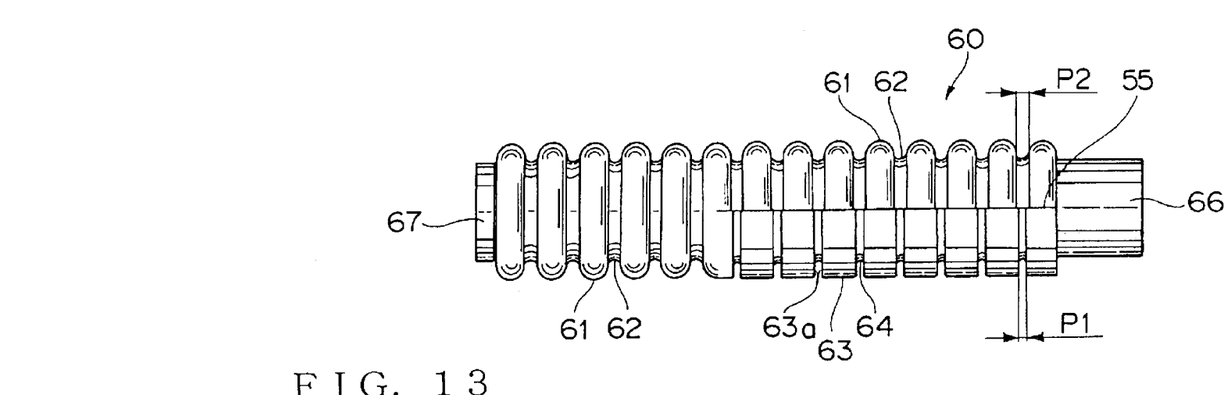
FIG. 13 is a plan view illustrating a third preferred embodiment of a harness-applied armoring member according to the present invention.
Figure 14:
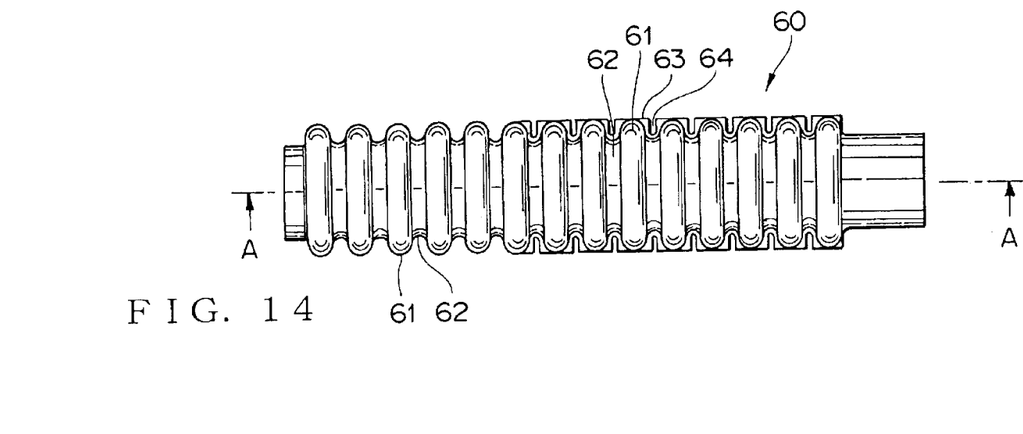
FIG. 14 is a side view illustrating the third preferred embodiment of a harness-applied armoring member according to the present invention.
Figure 15:
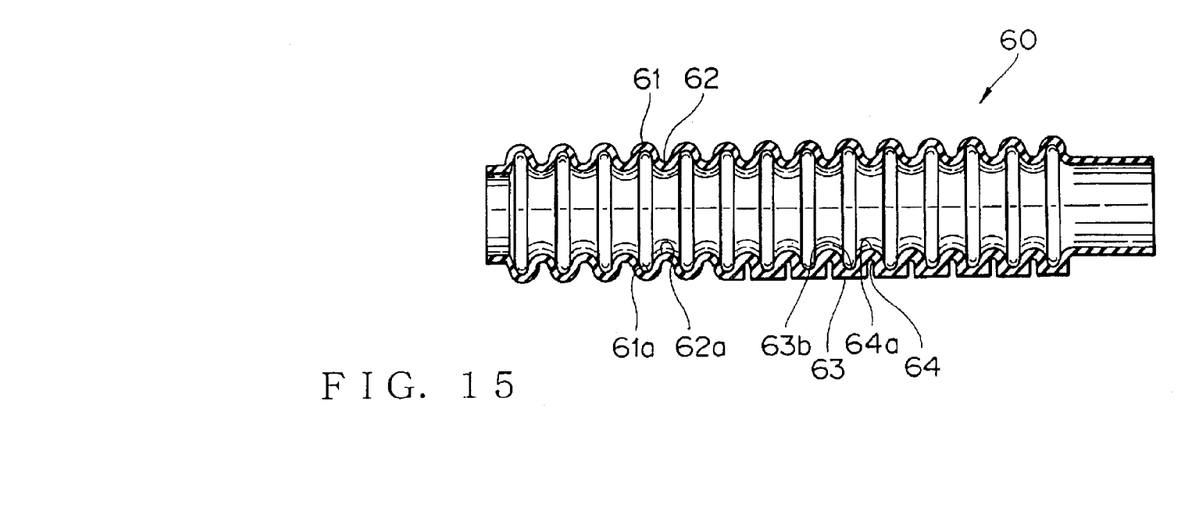
FIG. 15 is a cross sectional view taken along A—A line in FIG. 14, illustrating the third preferred embodiment of a harness-applied armoring member according to the present invention.

As shown in FIGS. 13 (plan view), 14 (side view), and 15 (cross sectional view taken along A—A line in FIG. 14), a harness-applied armoring member 60 is integrally formed with synthetic rubber and has bellows-shape convex strips 61 and concave grooves 62 both having a normal size for a front half in the longitudinal direction thereof, bellows-shape convex strips 61 and concave grooves 62 both having a normal size for one side of the rear half, and wide convex strips 63 and narrow concave grooves 64 for an opposite side of the rear half.

An outer surface 63a of the wide convex strip 63 is formed in a rectangular shape in its cross section and adjacent outer surfaces 63a stand close to each other, thereby the outer surface 63a abuts against the adjacent outer surface 63a upon the bending of the armoring member 60 so as to attain a large bending radius. An outer surface of the other convex strip 61 is formed in an arc-shape in its cross section. An inner surface 61a, 63b (FIG. 15) of the convex strip 61, 63 and a trough 62a, 64a of the concave groove 62, 64 are formed in an arc-shape.

As shown in FIG. 13, the convex strip 61 having the normal size continues to an opposite side in the diameter direction of the wide convex strip 63, while the concave groove 62 having the normal size continues to an opposite side in the diameter direction of the narrow concave groove 64 situated between the wide convex strips 63. An inner width $P_1$ of the narrow concave groove 64 is about half of an inner width $P_2$ of the concave groove 62 having the normal size. The switching position of the large and small convex strips 61 and 63 or concave grooves 62 and 64 is on a plane (55), which penetrates through the center line of the armoring member 60. A pitch and height of the mountain (i.e. outer diameter of the armoring member 60) of each convex strip 61 and 63 is constant.

The armoring member 60 can be easily molded by adding some modification to a mold for molding a bellows part of a waterproof grommet (not shown) for use in a vehicle, for example. Since it is made of rubber, there is no need to divide it like the armoring member 34 (FIG. 9) made of synthetic resin. Here, the convex strip 61 having the normal size means a convex strip, which has a size and shape similar to those of a convex strip of a bellows portion of a waterproof grommet that is usually used for a bending portion of a wiring harness for use in a vehicle, for example.

At both ends in the longitudinal direction of the armoring member 60, a cylindrical portion 66, 67 having a diameter smaller than a bellows diameter is formed, and for example, the long cylindrical portion 66 continuing to the wide convex strip 63 is fixed to the outer circumference of the wiring harness 5 by bundling with a vinyl tape in the harness-fixing part 68 (FIG. 16) at the vehicle body-side or fixed to a rotatable member (not shown) in the harness-fixing part 67. Since the armoring member 60 is made of rubber having a resilient property, therefore there may be less necessity that the rotatable member absorbs the twist of the armoring member 60 upon the opening or closing of the slide door 2 (FIG. 9). The short cylindrical portion 67 at the front end is fixed to the outer circumference of the wiring harness 5 by bundling with a tape.

Figure 16:
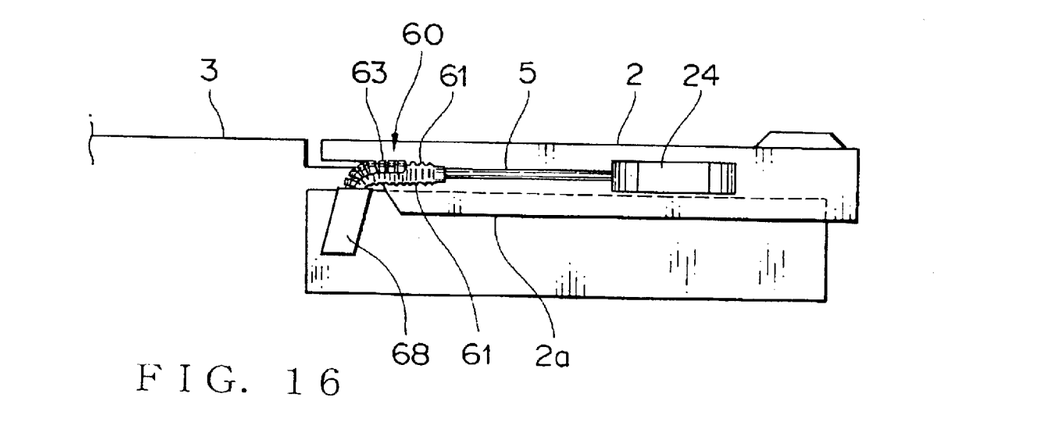
FIG. 16 is a plan view when a slide door is fully closed, illustrating a preferred embodiment of a harness-arranging structure applying the third preferred embodiment of a harness-applied armoring member according to the present invention.

When the slide door 2 is fully closed as shown in FIG. 16, each convex strip 61 having the normal size at one side of the armoring member 60 is located inside in the bending direction and bends with a small radius pivotally around the harness-fixing part 68, thereby the armoring member 60 smoothly bends in the closing direction of the slide door 2 without an interference with a door trim 2a made of synthetic resin of the slide door 2.

Figure 17:
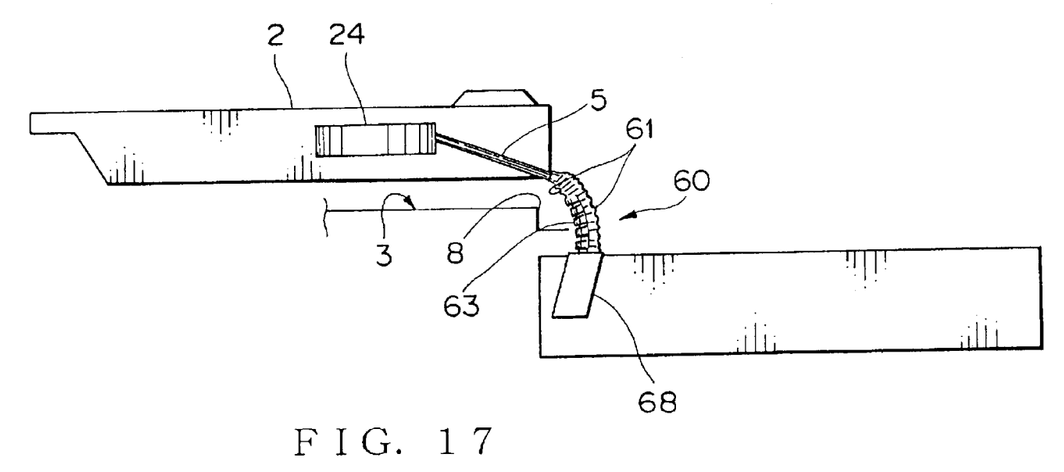
FIG. 17 is a plan view when a slide door is fully opened, illustrating a preferred embodiment of a harness-arranging structure applying the third preferred embodiment of a harness-applied armoring member according to the present invention.

When the slide door 2 is fully opened as shown in FIG. 17, the opposite side of the armoring member 60 having the wide convex strips 63 and the narrow concave grooves 64 for the rear half of the armoring member 60 is located inside in the bending direction and bends with a large radius pivotally around the harness-fixing part 68 by the abutting between the wide convex strips 63, thereby preventing an interference between the armoring member 60 and the center pillar 8 of the vehicle body 3 from occurring. Due to the front half of the opposite side of the armoring member 60, that is, due to the convex strips 61 and the concave grooves 62 (FIG. 13) both having the normal size situated further from the harness-fixing part 68, the front half of the armoring member 60 smoothly bends with a radius smaller than that of the rear half toward the slack-absorbing device 24 in the slide door 2.

Instead of the wide convex strip 63 of the armoring member 60, a pitch of the convex strip 61 having the normal size may be set small so as to make the concave groove 62 between the convex strips 61 narrow, thereby attaining a large bending radius for the armoring member 60. Further, instead of using rubber, by using another resilient material, the armoring member 60 may be integrally molded. Further, depending on the bending configuration of the armoring member 60, the convex strips 61 and the concave grooves 62 both having the normal size may be formed at one side of the armoring member 60, while only the wide convex strips 63 and the narrow concave grooves 64 may be formed for the whole length of the opposite side of the armoring member 60. Furthermore, in the preferred embodiment described above, the narrow concave groove 64 is formed at the outer circumference-side, however, instead, the narrow concave groove (64) may be formed at the inner circumference-side so as to make the convex strips (63) at the inner circumference-side abut against each other when the armoring member 60 bends in the reverse direction. Such an embodiment can also be useful in the case of the corrugated tube (34) as described above.

With the preferred embodiment described above, the harness-applied armoring member 60 can be prevented from being worn or damaged due to an interference with the vehicle body 3 and the door trim 2a, and an inexpensive armoring member 60 can be attained by using a rubber such as ethylene-propylene-diene terpolymer (EPDM). Further, the armoring member 60 of the same specification can be used for right and left slide doors 2, thereby improving the economy.

Among the harness-applied armoring member 1 using the pieces 10 according to the first preferred embodiment, the harness-applied armoring member 34 as a corrugated tube according to the second preferred embodiment, and the harness-applied armoring member 60 made of rubber according to the third preferred embodiment, there are common subject matters that each armoring member is a flexible movable member and that the stopper 11 (FIG. 3) of the piece 10 in the first preferred embodiment, the facing surface 39a (FIG. 9) of the wide convex strip 39 in the second preferred embodiment, and the facing surface 63a of the wide convex strip 63 in the third preferred embodiment act as the respective abutting parts so as to bend the respective flexible movable members (1, 34, and 60) with a large radius.

The aforementioned preferred embodiments are described to aid in understanding the present invention and variations may be made by one skilled in the art without departing from the spirit and scope of the present invention.

What is claimed is:

1. A harness-applied armoring member for inserting electric wires therein, wherein a bending radius of the armoring member varies depending on a bending direction of the armoring member, the harness-applied armoring member comprising a plurality of pieces connected with each other in series, each said piece having stopper parts for controlling a bending angle between the adjacent pieces, with a front half of the pieces bending in a first direction and not a second direction, and a rear half of the pieces bending in the second direction and not in the first direction, the second direction being opposite to the first direction.

2. The harness-applied armoring member according to claim 1, wherein an abutting angle or abutting position of the stopper parts of the front half of the pieces is opposite to that of the rear half of the pieces.

3. A harness-applied armoring member for inserting electric wires therein, wherein a bending radius of the armoring member varies depending on a bending direction of the armoring member, the harness-applied armoring member comprising a plurality of convex strips formed in the circumferential direction of the armoring member and concave grooves formed between the adjacent convex strips, wherein the convex strips and the concave grooves are alternately arranged in the longitudinal direction of the armoring member, and an inner width of the concave groove varies depending on the bending direction of the armoring member.

4. The harness-applied armoring member according to claim 3, wherein the concave groove having a large inner width is arranged for a front and rear halves of one side of the armoring member and for a front half of an opposite side of the armoring member, while the concave groove having a small inner width is arranged for a rear half of said opposite side of the armoring member.

5. The harness-applied armoring member according to claim 4, wherein the armoring member can be separated into a first divided tube including the concave grooves having a large inner width and a second divided tube including at least the concave grooves having a small inner width.

6. The harness-applied armoring member according to claim 4, wherein the armoring member is formed integrally being made of resilient material.

7. The harness-applied armoring member according to claim 3, wherein the armoring member can be separated into a first divided tube including the concave grooves having a large inner width and a second divided tube including at least the concave grooves having a small inner width.

8. The harness-applied armoring member according to claim 3, wherein the armoring member is formed integrally being made of resilient material.

9. A harness-arranging structure comprising:
  a fixed structure;
  a slide structure including a slack-absorbing device for absorbing a slack of electric wires; and
  a harness-applied armoring member for inserting the electric wires therein, the harness-applied armoring member comprising:
    a plurality of nieces including a front half of the nieces bending in a first direction and not bending in a second direction, and a rear half of the pieces bending in the second direction and not the first direction, the second direction being opposite to the first direction,
  wherein the electric wires are arranged from the fixed structure to the slack-absorbing device of the slide structure and the armoring member is disposed between the fixed structure and the slide structure.

10. The harness-arranging structure according to claim 9, wherein the armoring member is bent with a small radius from the fixed structure-side when the slide structure is fully closed, while the armoring member is bent with a large radius from the fixed structure-side when the slide structure is fully opened.

11. The harness-arranging structure according to claim 10, wherein the fixed structure comprises a harness-fixing part to which the armoring member is connected.

12. The harness-arranging structure according to claim 9, wherein the fixed structure comprises a harness-fixing part to which the armoring member is connected.

* * * * *